Sept. 28, 1954  E. A. WILLEY  2,690,342
CROP DIVERTING FENDER FOR FARM TRACTORS
Filed May 17, 1952  3 Sheets-Sheet 1
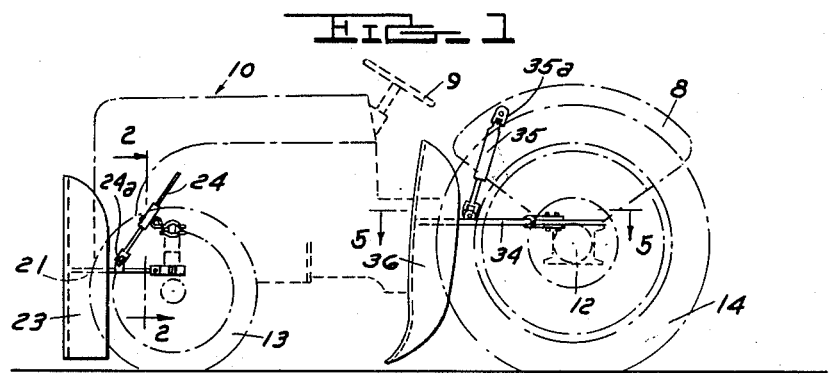
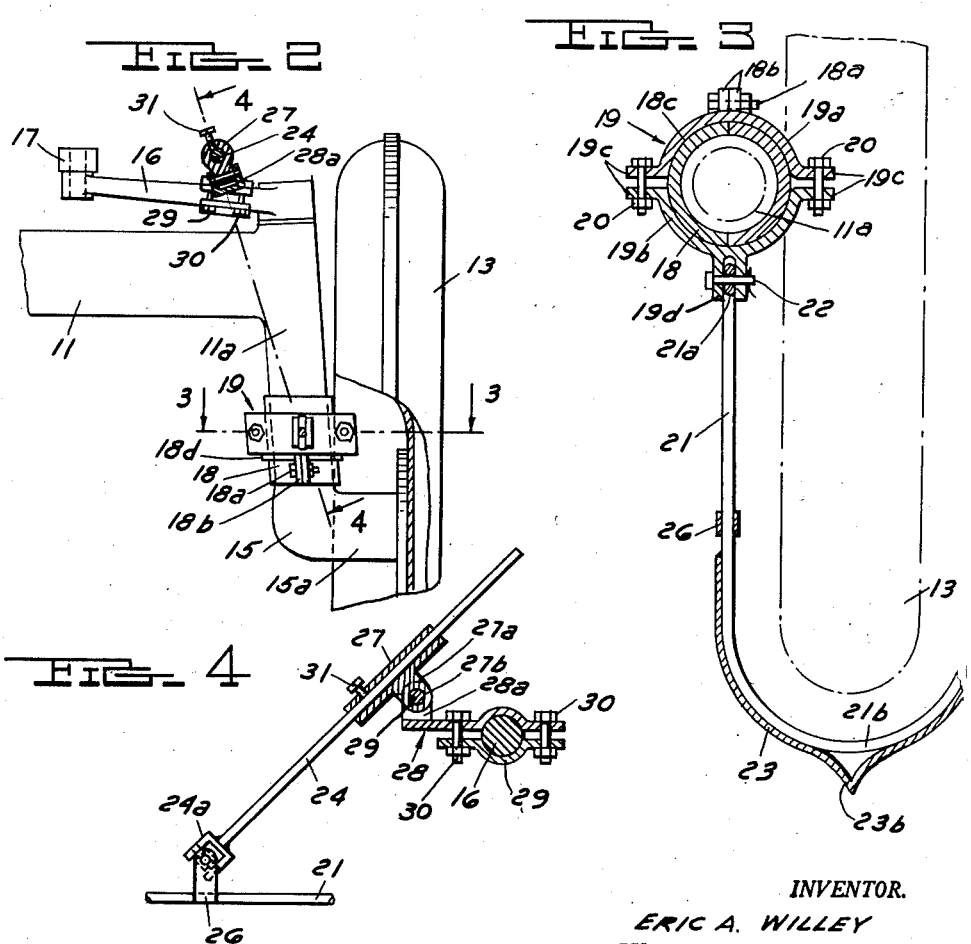
INVENTOR.
ERIC A. WILLEY
BY
ATTORNEYS

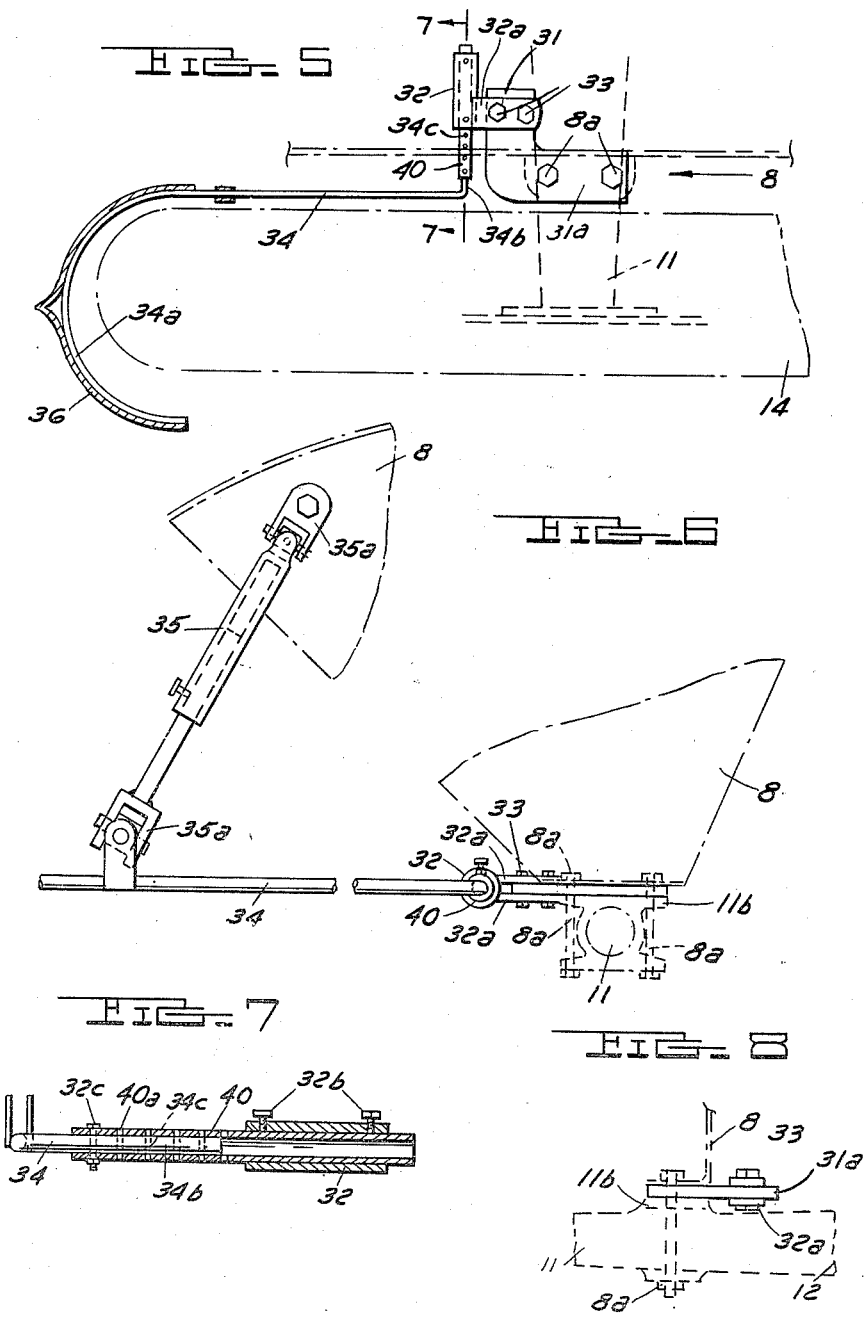

Sept. 28, 1954  E. A. WILLEY  2,690,342
CROP DIVERTING FENDER FOR FARM TRACTORS
Filed May 17, 1952  3 Sheets-Sheet 3
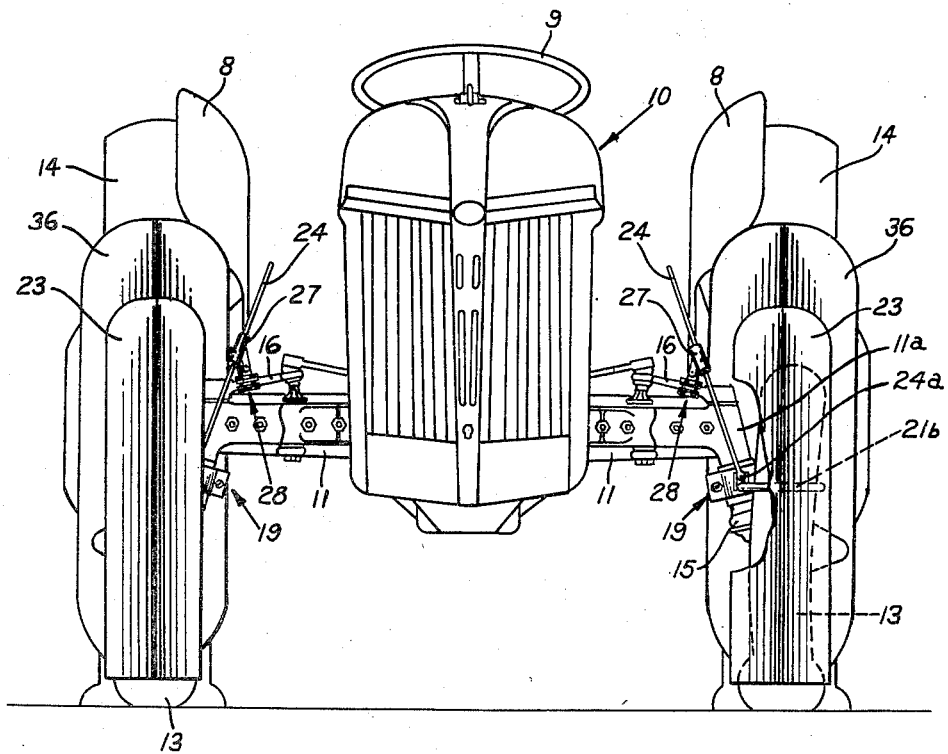
INVENTOR.
ERIC A. WILLEY
BY
AND
ATTORNEYS Patented Sept. 28, 1954

2,690,342

UNITED STATES PATENT OFFICE 2,690,342

CROP DIVERTING FENDER FOR FARM TRACTORS

Eric A. Willey, Birmingham, Mich., assignor, by mesne assignments, to Ford Motor Company, Dearborn, Mich., a corporation of Delaware Application May 17, 1952, Serial No. 288,383

2 Claims. (Cl. 280—160)

This invention relates to improved fenders for tractor wheels and more particularly to fenders for the tractor front wheels which are steerable therewith.

The plants of certain row crops when fully matured branch out and completely block the aisles between each of the rows. When the harvesting machinery enters the field, the tractor, which is usually the prime mover for the harvesting machine, proceeds between the rows and the wheels of such tractor beat down and crush the crop extending into the rows. Obviously, not a little of the crop is lost because it is virtually impossible for the crop gathering mechanism of the harvesting machine to raise up the crushed vegetation so that the crop on such vegetation can be harvested.

A specific illustration of the above mentioned difficulties is encountered when a tractor is utilized to pull a cotton stripper through a field of cotton. The cotton stalks are usually well branched, and the branches entangle themselves in the tractor wheels. Such branches are either broken off or crushed on the ground and the cotton bolls thereon are placed out of reach of the gathering mechanism and the cotton is irretrievably lost. Admittedly, there have been provided heretofore crop diverting fenders which divert the crop away from the tractor wheels to reduce the crop damage caused by the tractor. However, most of such fenders have been non-adjustable and cannot, therefore, be properly positioned to adequately protect the crop for all conditions of usage of the tractor when crop harvesting.

Accordingly, it is an object of this invention to provide improved fenders for tractor wheels for diverting the crop away from the wheels to reduce crop damage.

Another object of this invention is to provide adjustable fenders for the tractor front wheels which are steerable therewith.

Still another object of this invention is to provide adjustable fenders for tractor front wheels which are automatically lifted.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of the tractor showing the improved fenders and mountings therefor attached to the tractor;

Figure 2 is an enlarged scale sectional view taken along the plane 2—2 of Figure 1;

Figure 3 is an enlarged scale sectional view taken along the plane 3—3 of Figure 2;

Figure 4 is a sectional view taken along the plane 4—4 of Figure 2;

Figure 5 is an enlarged scale sectional view taken along the plane 5—5 of Figure 1;

Figure 6 is an enlarged scale side elevational fragmentary view showing the mounting for the rear wheel fenders;

Figure 7 is a cross sectional view taken along the plane 7—7 of Figure 5; and

Figure 8 is a fragmentary detail view of the fender mounting of the tractor fender mounting provided on the tractor rear axle.

Figure 9 is a front view of the tractor of Figure 1.

As shown on the drawings:

In Figure 1 there is shown a tractor 10 which has longitudinally spaced front and rear axles 11 and 12 which respectively have journaled on their ends front and rear wheels 13 and 14. Tractor front axle 11 has integrally formed vertically disposed spindle housings 11a respectively provided on its lateral extremities. A front wheel spindle 15 is journaled within the spindle housing 11a for rotatable movement about its vertical axis and tractor front wheel 13 is rotatably journaled on the lower horizontal portion 15a of spindle 15. The upper end of spindle 15 projects somewhat above the housing 11a and a crank arm 16 is non-rotatably secured thereto. A drag link 17 is pivotally secured to the free end of crank arm 16. The drag link has its one end suitably connected to the steering mechanism of the tractor (not shown) so that rotation of the tractor steering wheel 9 effects rotation of the wheel spindle 15 to turn the front wheels 13. As both tractor front wheels 13 are identically mounted, further description of the mounting of the other tractor wheel is not believed necessary.

There will now be described the front wheel fenders and the mountings therefor. Inasmuch as the fenders and their mountings are identical, only one set thereof will be described. Referring to Figure 2, a split bearing sleeve 18 is secured by a pair of bolts 18a about the lower end of the spindle housing 11a. Bolts 18a traverse aligned integral ears 18b formed on each of the sleeve halves 18. Inasmuch as the spindle 11a is not truly cylindrical, the split sleeve 18 is provided about spindle 11a to form a truly cylindrical external surface 18c so that a split collar 19 surrounding the split bearing sleeve 18 may be freely rotatable thereon. The split collar 19 comprises a pair of half portions 19a and 19b (Figure 3) which respectively have integral outwardly bent tabs 19c. The tabs 19c have transversely aligned apertures which permit the insertion of bolts 20 therethrough to rotatably secure the split collar 19 about the split sleeve 18. An integral annular lug 18d provided on the split bearing sleeve 18 prevents downward displacement of the split collar 19. The half portion 19b of split collar 19 has a pair of transversely spaced integral lugs 19d which project forwardly. The lugs 19d are suitably transversely apertured and the rear end of a fender bracket 21 which has an eye portion 21a is pivotally secured between the lugs 19d by a transverse pin 22 inserted through the eye 21a thereof and the lugs 19d.

The fender bracket 21 comprises a rod and has an arcuate forward end 21b which substantially surrounds the tire of the front tractor wheel 13. A sheet metal fender 23 is secured in vertically disposed relationship by welding to the arcuate forward end 21b of the bracket 21. Fender 23 defines a sharp pointed vertical front edge 23b which facilitates parting the crop as the tractor moves down between the rows of crop.

The forward end of the fender bracket 21 is connected to the crank arm 16 by a rod-like link 24. The lower forward end of link 24 is suitably universally pivotally connected, as shown at 24a, to an upstanding bracket 26, provided on the forward end of the fender and bracket 21. The other end of link 24 is slidably inserted within a connector member 27. The connector member 27 is of generally tubular configuration and has an integral radially disposed lug 27a which is apertured as shown at 27b to permit pivotal mounting of such lug to a bracket 28. The bracket 28 has an upstanding lug portion 28a which is transversely apertured and a bolt 29 inserted through the aperture in lug 28a and through the aligned aperture 27b of the lug 27a pivotally secures the connector to the upstanding lug 28a. Bracket 28 partially surrounds the crank arm 16 and a clamp 29 partially surrounding the underneath portion of the crank arm 16 permits securing the bracket 28 to such crank arm by a pair of bolts 30. Link 24 is adjustably secured within the tubular connector 27 by a radially disposed bolt 31 to permit vertical adjustment of the bracket 32.

On the rear axle housing 11 there is provided the usual integral mounting pad 11b which conveniently permits mounting the tractor fender 8 thereon by a pair of vertically disposed bolts 8a inserted through suitable vertical apertures in such mounting pad. The pad 11b and the bolts 8a conveniently permit mounting an angle-shaped plate-like bracket 31 thereon. The plate-like bracket 31 is horizontally disposed and has its transversely disposed leg 31a facing towards the front of the tractor, as best shown in Figure 5. A tubular mounting member 32 (Figure 6) has a pair of rearwardly projecting lugs 32a secured in vertically spaced relationship to the mounting member 32, as by welding, which permits mounting such member on the transverse leg portion 31a of bracket 31 by a pair of bolts 33 which respectively traverse the lug 32a and the leg 31a to secure such lug to bracket 31.

A rod-like fender bracket 34 is provided which has an arcuately shaped forward end 34a and a cylindrical rear end portion 34b bent at right angles to the bracket 34 and such bent end portion 34b slidably fits within a tubular sleeve 40. The bent end portion 34b has a plurality of longitudinally spaced transverse holes 34c and such holes are selectively alignable with similar holes 40a in sleeve 40 so that a bolt 32c, inserted through a selected aligned pair of such holes, secures the end portion 34b in a desired position of lateral adjustment relative to the sleeve 40. Additional adjustment is readily obtainable by sliding sleeve 40 within connector 32, bolts 32b in such connector securing sleeve 40 therein when suitably adjusted.

A longitudinally adjustable link 35 has its ends respectively connected to the forward end of the bracket 34 and to the tractor fender 8. The ends of link 35 are respectively provided with suitable universally swivelling connectors 35a which conveniently permits the crop fender to be moved vertically and laterally. As each of the rear crop fenders and their mounts are identical, only one has been described.

As the lateral spacing between the tractor rear wheels 14 is varied, the fender brackets 34 are laterally adjusted by repositioning the bent end 34b of such brackets within the connector 32 by selectively aligning the transverse holes 34c and 40a so that the bolt 32c may be inserted through a selected pair of holes. A sheet metal fender 36 is vertically mounted on the arcuate end 34a of the bracket 34 and is secured in place as by welding. The fender may be conveniently vertically inclined by simply longitudinally adjusting the link 35. Hence, the fender can be adjusted to suit any wheel spacing obtainable as well as inclined relative to the vertical to suit varying crop conditions.

From the foregoing description, it is thus clearly apparent that there is here provided an improved crop fender mounting arrangement which permits a wide variety of adjustments of the fenders so as to suit all crop conditions and it will also be noted that the front wheel fenders will turn with the tractor front wheels which permits the tractor to follow uneven rows with a minimum of crop damage. The improved fenders and their mountings, constructed in accordance with this invention, are of simple construction and hence are economical to manufacture.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In combination with a tractor of the type having a rigid front axle, a generally vertical spindle housing on each end of said axle and a pair of front wheel spindles respectively journaled in said housings for steering movements, a pair of brackets respectively journaled on said housings for pivotal movements in a horizontal plane and projecting forwardly relative to said housings, a pair of crop fenders respectively mounted on the forward ends of said brackets and constructed and arranged to respectively surround wheels carried by said wheel spindles, a steering crank for pivoting each wheel spindle relative to its spindle housing, and a pair of links respectively connecting said cranks and said fenders to shift said fenders in accordance with the steering movements of said wheel spindles.

2. The combination defined in claim 1 wherein said fenders are respectively pivotally mounted for vertical movements relative to said brackets and said links include means for adjusting their effective lengths, whereby said fenders may be selectively vertically inclined.

References Cited in the file of this patent

UNITED STATES PATENTS

| Number | Name | Date |
| --- | --- | --- |
| 1,463,817 | Horton | Aug. 7, 1923 |
| 1,811,054 | Kipp et al. | June 23, 1931 |
| 1,818,468 | Fickenscher | Aug. 11, 1931 |
| 2,064,480 | Lock et al. | Dec. 15, 1936 |
| 2,262,876 | Baker et al. | Nov. 18, 1941 |